United States Patent
Yang et al.

(10) Patent No.: US 12,399,757 B2
(45) Date of Patent: Aug. 26, 2025

(54) REST INTERFACE SPECIFICATION ENCAPSULATION SYSTEM BASED ON NETWORK SNIFFING

(71) Applicant: ZHEJIANG UNIVERSITY, Zhejiang (CN)

(72) Inventors: Zitong Yang, Hangzhou (CN); Jianwei Yin, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 458 days.

(21) Appl. No.: 18/013,873

(22) PCT Filed: Apr. 21, 2022

(86) PCT No.: PCT/CN2022/088308
§ 371 (c)(1),
(2) Date: Dec. 29, 2022

(87) PCT Pub. No.: WO2022/242415
PCT Pub. Date: Nov. 24, 2022

(65) Prior Publication Data
US 2023/0305907 A1 Sep. 28, 2023

(30) Foreign Application Priority Data
May 21, 2021 (CN) .......................... 202110558445.1

(51) Int. Cl.
*G06F 9/54* (2006.01)
*H04L 9/40* (2022.01)

(52) U.S. Cl.
CPC ............ *G06F 9/54* (2013.01); *H04L 63/0823* (2013.01); *G06F 2209/547* (2013.01)

(58) Field of Classification Search
None
See application file for complete search history.

(56) References Cited

U.S. PATENT DOCUMENTS 10,747,505 B1 8/2020 Lester et al.
11,095,774 B1 * 8/2021 Willshire ................ G06F 9/547
(Continued)

FOREIGN PATENT DOCUMENTS

CN 107301137 10/2017
CN 110224990 9/2019

*Primary Examiner* — Adam Lee
(74) *Attorney, Agent, or Firm* — Jiwen Chen; Joywin IP Law PLLC (57) ABSTRACT

The present invention discloses a REST interface specification encapsulation system based on network sniffing, comprising: an API traffic sniffing module, an API specification extraction module and an API sharing platform module. The API traffic sniffing module realizes the interception and analysis of the API call traffic in mobile applications based on the principle of Man-in-the-Middle Attack. The API specification extraction module is responsible for filtering and classifying the intercepted API call collection, and automatically generating the API specification in JSON HyperSchema format. The API sharing platform module implements sharing, openness and display of the API specification with JSON HYPERSCHEMA as the core, and provides sharing permission control, search, API call test, and API specification error correction function, the REST interface specification encapsulation system improves the efficiency and accuracy of API specification extraction, and the encapsulation system is versatility and practical.

8 Claims, 2 Drawing Sheets

(56) References Cited

U.S. PATENT DOCUMENTS

2007/0055711 A1\* 3/2007 Polyakov .............. G06F 21/566
                                                    707/999.203
2020/0320203 A1\* 10/2020 Ting ....................... G16H 10/60

\* cited by examiner

REST INTERFACE SPECIFICATION ENCAPSULATION SYSTEM BASED ON NETWORK SNIFFING

This is a U.S. national stage application of PCT Application No. PCT/CN2022/088308 under 35 U.S.C. 371, filed Apr. 21, 2022 in Chinese, claiming priority of Chinese Application No. 202110558445.1, filed May 21, 2021, all of which are hereby incorporated by reference.

TECHNICAL FIELD

The present invention belongs to the technical field of service encapsulation, in particular to a REST interface specification encapsulation system based on network sniffing.

DESCRIPTION OF RELATED ART

Mobile applications are developed based on Android or iOS platforms, and request and transmit data to the server in the way of an application interface (API). The API can realize the interaction of cross-platform, operating system and programming language between applications and servers, which greatly simplifies the development process of program developers and improves the efficiency of program development. Among them, REST (Representational State Transfer) API has become the mainstream of interface forms used in mobile application development with its advantages of loose coupling. More and more organizational and enterprises use REST API as an important way for clients and servers to transfer data and provide services externally. However, to achieve the integration of such third-party services, the specification description of the REST API (referred to as the interface specification) is required, which is the basis for service and API calls.

At present network, many REST APIs that provide external service to the outside world lack a unified, machine readable interface specification. For example, the largest API open platform Programmable Web in foreign countries does not provide a unified API description, but is provided by the AP provider itself. In the domestic Alibaba Cloud market, aggregated data and many other AP markets, JSON examples or tables are used to describe the input and output parameters of the API. This description method usually requires the API caller to manually understand and construct the client code, and the programming language examples given in the description usually cannot meet the actual development needs of users.

On the other hand, the mainstream REST API description language OPEN API lacks the client verification function, that is, whether the input parameter in the client verifies the API specification. Compared with the server verification function, the client verification function can quickly provide feedback to users to avoid wasting traffic by transmitting invalid parameters. Other REST API use JSON Schema to describe their data structures, but JSON Schema lacks the ability to describe the entire REST API model and cannot identify metadata such as URL or HTTP methods.

In the traditional API specification extraction method, the process of analyzing and extraction a REST API in an application through the HTTP traffic can generally be divided into the following three steps: (1) operating within the application, so that the application can send REST API requests to the background and obtain application data. At this time, HTTP traffic interception technology is used to intercept the generated HTTP data. For PC side web applications, you can directly use browser developer tools to obtain the clear text HTTP packets requested by them. However, this method is not applicable in mobile native applications and web applications. If you simply intercept the router connected to the mobile terminal, you can usually only intercept HTTP traffic or encrypted HTTPS traffic. At present, most mobile applications use HTTPS protocol to transmit key data, so developers (reverse engineers) with reverse engineering knowledge are usually required to make special modifications to mobile devices.

(2) API requests in HTTP(S) traffic are filtered and classified. Real HTTP(S) traffic data usually includes many API requests unrelated to key tasks, such as advertisement related requests. At this time, the reverse engineer can filter out all JSON API requests under a specific domain name through a domain name, a request content type and other characteristics. In addition, keywords can also be used to filter the API. However, in general, before obtaining the real HTTP(S) traffic, the reverse engineer cannot directly locate the target API, but can only manually select from a large number of API collections based on experience, which greatly reduces the efficiency of business development.

(3) Extracting a unified schema related to syntax and semantics of similar APIs, that is, generating API specifications. The parameters contained in API specifications usually include URL template format, structure of request body and response body, semantics of parameters and response values, etc. Because the JSON structure is flexible, the JSON data structure in the API response is usually complex and changeable, and there may be slight differences between different instances. The accuracy and efficiency of the common JSON pattern among multiple instances by relying in manually mining are lower.

SUMMARY OF THE INVENTION

In view of the above, the present invention provides a REST interface specification encapsulation system based on network sniffing, comprising: an API traffic sniffing module, an API specification extraction module and an API sharing platform module.

The API traffic sniffing module realizes the interception and analysis of the API call traffic in mobile applications based on the principle of Man-in-the-Middle Attack.

The API specification extraction module is responsible for filtering and classifying the intercepted API call collection, and automatically generating the API specification in JSON HyperSchema format.

The API sharing platform module implements the sharing, openness and display of the API specification with JSON HYPERSCHEMA as the core, and provides sharing permission control, search, API call test, and API specification error correction function.

Compared with the prior art, the above REST interface specification encapsulation system based on network sniffing improves the efficiency and accuracy of API specification extraction, and the encapsulation system is versatility and practical.

BRIEF DESCRIPTION OF THE DRAWINGS

In order to more clearly explain the embodiment of the present invention or the technical solution in the existing technology, the following drawings will be briefly introduced to the attachment of the embodiment or the existing technology description. It is some embodiments of the present invention. For ordinary technical in the art, other drawings can be obtained from these drawings without any creative effort.

DETAILED DESCRIPTION OF THE INVENTION

In order to make the purpose, technical scheme and advantages of the present invention clearer, the present invention is further described in detail below in combination with the drawings and embodiments. It should be understood that the specific embodiments described herein are only used to explain the present invention and do not limit the scope of protection of the present invention.

In order to solve the problems of traditional API specification extraction methods, such as difficulty in analyzing encrypted data, low efficiency of API classification, and complex API specification generation process, the embodiment provides a REST interface specification encapsulation system based on network sniffing.

Figure 1:
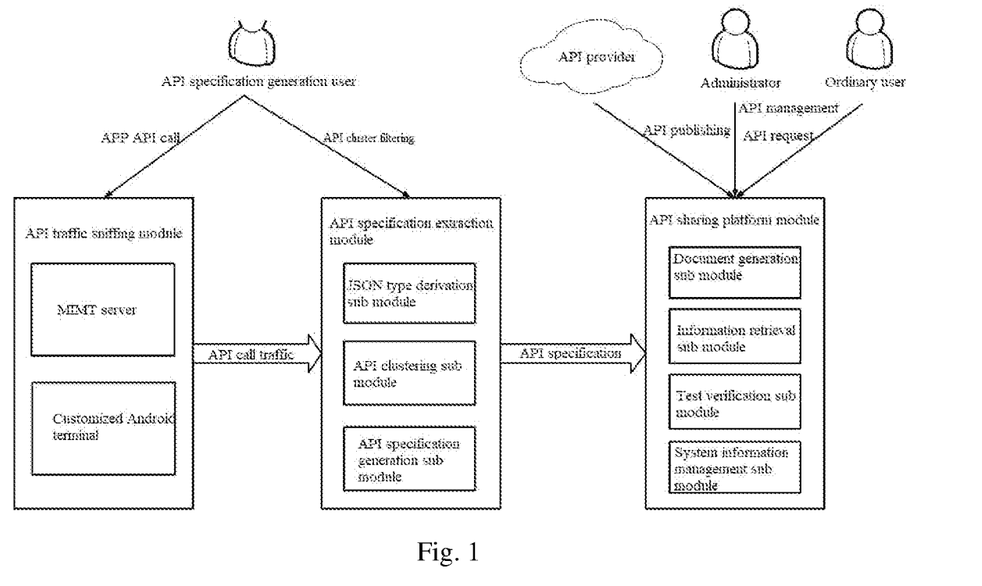
FIG. 1 is a structure diagram of a REST interface specification encapsulation system based on network sniffing.

FIG. 1 is a structure diagram of a REST interface specification encapsulation system based on network sniffing. As shown in FIG. 1, the REST interface specification encapsulation system provided by the embodiment includes an API traffic sniffing module, an API specification extraction module and an API sharing platform module. Wherein, the API traffic sniffing module realizes the interception and analysis of the API call traffic in mobile applications based on the principle of Man-in-the-Middle Attack. The API specification extraction module is responsible for filtering and classifying the intercepted API call collection, and automatically generating the API specification in JSON HyperSchema format. The API sharing platform module implements the sharing, openness and display of the API specification with JSON HYPERSCHEMA as the core, and provides sharing permission control, search, API call test, and API specification error correction function.

In the embodiment, the API traffic sniffing module includes a mobile terminal and a man in the middle attack server. The mobile terminal is embedded with a self signed root certificate. The man in the middle attack server has a private key of the self signed root certificate embedded by the mobile terminal, and interacts with the API specification encapsulation user. The API specification encapsulation user operates a mobile application at a mobile terminal to generate an API call traffic. The mobile terminal forwards the API call traffic to the man in the middle attack server through VPN, the man in the middle attack server completes the SSL handshake with the mobile terminal and sends the API call traffic to a target application server, and then forwards the response to the mobile terminal after obtaining the response from the target application server, the API call traffic intercepted by the man in the middle attack server is a input of the API specification extraction module.

In the embodiment, in order to intercept the clear text of the HTTPS communication, a middle layer needs to be set up between the mobile terminal and the server, the middle layer is faked into a original server for the client, called the MITM server, that is, the man in the middle attack server, and the middle layer is faked into a mobile terminal, called the MITM client.

In order to obtain the trust of the original mobile terminal, a root certificate issued by the local CA (CertificateAuthority) is first installed in the original mobile terminal. Then setting an agent for the mobile terminal so that its request can be sent to the MITM server. One way to set the agent is to allow customers to connect to the network via VPN. When the customer sends a request to establish a connection, the MITM server will immediately reply, just like setting a Connect pipeline. The original mobile terminal initializes the TLS connection and uses SNI to indicate the host name it wants to connect. MITM server is connected to the original server and uses the SNI host name specified by the original mobile terminal to create a TLS connection. The server takes a matching certificate as a response. The MITM server extracts the CA and SAN values from the server certificate, generates the interception certificate, and resumes handshake with the client TLS that was paused previously. The interception certificate is verified by the root certificate issued by the local CA at the original client, and continues to complete the SSL handshake with the MITM server. Although the application request package is between the user terminal and the MITM server, the transmission between the MITM client and the application server is encrypted, but the communication between the MITM server and the client can still be obtained.

When constructing the API traffic sniffing module, the man in the middle attack server is need to be installed. At the same time, performing a CA certificate installation and a network configuration to implement the sniffing HTTP traffic by executing the man in the middle attack server, that is, API call traffic.

In the embodiment, selecting MITMPROXY as the man in the middle attack server. MITMPROXY is a free open source interactive software, which has three ways to interact to the outside world. The first is the command line method, it can be used for interception, inspection, modification, and replacement of Web traffic that uses various protocols, such as HTTP/1, HTTP/2, WebSocket or any other protocols protected by SSL/TLS. Users can view and decode various message types from HTML to Protobuf in a formatted way, intercept specific messages immediately, modify them before they arrive at the destination, and then put them back to the client or server later. The second way is the web interface, which provides a DevTools experience similar to browser Chrome, such as request interception and playback. The third method is the Python API, users can write powerful plug-in and scripts that fully control MITMPROXY, and can realize automatic modification messages, redirect traffic, visualized messages, or realize custom commands. After Mitmproxy is installed and started for the first time, you can find the CA certificate "mitmproxycacert. cer" generated by the Mitmproxy under the folder "/. mitmproxy".

In the embodiment, the CA certificate of the mobile terminal (such as the Android system) is divided into two categories, which is permanently installed on the system as the system leaves the factory. One is user certificate, which can be installed or deleted by users. Starting from Android 7.0, unless specified by the application, the user certificate will no longer be trusted by the system. Therefore, the certificate needs to be installed as a system certificate. If you want to import the Android compatible certificate into the "system" certificate storage of Android, the superuser permission must be obtained in order to write/delete between the system subfolders. To this end, the Android system must include the "SU" (super user) program, which provides super user permission. Some Android systems do not include this program, in this case, all user certificates must be stored as system certificates.

In the embodiment, the mobile terminal and the server need to be under the same local area network. If the address of the server is 192.168.0.101, Mitmproxy's default proxy port is 8080, then the HTTP proxy address of the global proxy software of the mobile terminal needs to be set at 192.168.0.101:8080.

After Mitmproxy installation, CA certificate installation, and network configuration, starting mitmproxy to sniff the API call process, and using the following procedures:

mitmdump-w http_traces_file—anticache "example-.com~t json"

Among them, the "w" option indicates that the interception results are written to the file, and http_traces_file is the file path; the "-anticache" option indicates that the erase may cause the server to return the request header of "304not-modify" to avoid using the cache. The expression in double quotation is filtering expression, "example.com" indicates that only intercepting specific domain names, "~ T JSON" indicates that only intercepting the request header, "conent-type" can match the request of the regular expression "JSON", that is, the request body is a request of json.

Opening applications that need to extract API specifications, and using the functions that need to extract API specifications multiple times. For example, if you want to extract the search function, you can perform multiple search. Noting that the response data may be loaded in batches. In this case, you need to trigger data loading multiple times by pulling down rolling bar or clicking next page. Therefore, in the process of operation, observing whether a new request is generated in the Mitmproxy log interface.

The results of API traffic sniffing module obtain API call traffic are represented in the form of data columns, specifically including API request time, HTTP method, protocol, IP address, request path, status code, return result type, return result size, and request duration.

In the embodiment, the JSON API request and the corresponding response are referred to as one API call. Different API calls data have different API endpoints, parameters, and return results, an API calls data can derive a JSON Hyper Schema, but we hope to get a more generalized and universal JSON HYPERSCHEMA that can represent a class of JSON API requests. To solve this problem, the API specification extraction module provided by the embodiment includes a JSON type derivation sub module, an API clustering sub module and an API specification generation sub module.

Among them, the JSON type derivation sub module is used as the basis of the API cluster and API specifications, which is used to formally describe the JSON type. The formal description is:

Type::=Primitive|Composite|Union
Primitive::=Null|Boolean|Number|String
Composite::=Object|Array
Union::=(Type+Type)
Object::={k1:T1, k2:T2, . . . , kn:Tn}
Array::=[T1, T2, . . . , Tn]
RArray::=[Type*]

Among them, the root type Type includes basic type Primitive, composite type Composite and combined type Union. The basic type Primitive includes Null, Boolean, Number and String.

The composite type Composite includes an universal key value pair-pair type Object and an orderly list type Array. Rarray is a streamlined expression of Array. kn is a string type String, [T1, T2, . . . , Tn] indicates sequence. The combined type Union represents a collection of different basic types or composite types, and does not belong to the native type of JSON, but is introduced to solve the problem. Such as the Union type TU=(String+Number), which means that the type is allowed as String or Number In order to achieve a formalized description of the JSON type, it includes type initialization and type hybrid process. For the type initialization, init is used in the embodiment to represent the type initialization process, that is, the JSON element represented by root or value is converted into the formal description of the above JSON type.

For the type of hybrid process, in order to calculate the common Schema of JSON represented by the formal description of two JSON type, the embodiment proposes a type of hybrid operation, defining operator of the binary type of hybrid is $\oplus$, the basic operation rules for the mixed operation are:

1. Mixing two of the same basic types, and the result is the type itself. If T∈Primitive, then T⊕T=T.
2. Mixing two different basic types, the result is a combination type composed of the two types. Mixing a basic type and a composite type, the result is also the combination type. If Ta, Tb ∈Primitive, Tprimitive∈Primitive, Tcomposite∈Composite, Tobject∈Object, Tarray∈Array, then:

$$Ta \oplus Tb = (Ta+Tb)(Ta/=Tb)$$

$$Tprimitive \oplus Tcomposite = (Tprimitive+Tcomposite)$$

$$Tobject \oplus Tarray = (Tobject+Tarray).$$

3. Mixing two object types are still object types. This process will merge the two keys shared by the two objects, and turn their unique keys into optional keys.
4. The array needs to be streamlined before the array is mixed, that is, converting from Array to Rarray form. For each type of sub element in the array type, only one is reserved.
5. In the type mixing phase, a large number of union types Union may be generated. The way to mix union types with other types is: objects and objects, arrays and arrays, only one of each basic type is reserved. Ensuring that there are only one object type in the combination type, an array type, and the same basic type of the same type appears only once.

It can be introduced from the above operational rules, and the mixed operation meets the following exchange laws and binding laws. This nature makes the hybrid results have nothing to do with the order of operations, ensuring that the order of handling the JSON documentation does not affect the results of JSON Schema derivative.

$$Ta \oplus Tb = Tb \oplus Ta$$

$$(Ta \oplus Tb) \oplus Tc = Ta \oplus (Tb \oplus Tc)$$

The purpose of the API cluster is to classify the same type of JSON API to help screen APIs with a high frequency of calling, and prepare for obtaining more comprehensive information for analyzing different call instances of similar JSON APIs. Based on this, the API clustering sub module is used to calculate the similarity between API based on the JSON type similarity and URL similarity calculated according to the formal description of the JSON types, and then clustering to obtain multiple API sample clusters. Specifically:

(a) Calculating the URL similarity usim of the two API call traffic based on the weighted sum of URL path similarity and query similarity.

The basic conditions that need to be met in similar URLs are: 1. the protocol, domain name, and port number of URL are the same. The embodiment classifies at least one URL with different protocol, domain name and port number into different categories. 2. The path depth of the URL is the same. For the above two basic conditions, similar URLs must be the same in terms of protocol, domain name, port number, and path depth, but may be different in terms of path and query parameters. Therefore, URL similarity can be calculated according to path similarity and query similarity. If path similarity and query similarity are expressed as psim and qsim respectively, and their weights are wp and wq respectively, then URL similarity usim and distance udist can be expressed as:

$$usim = wp \times psim + wq \times qsim$$

$$udist = 1 - usim = 1 - wp \times psim + wq \times qsim$$

For path similarity psim, assuming that the two URLs have a total of n-pair paths, each sub-path score is scored si, and each pair of sub paths has a score based on whether it belongs to different types, then the path similarity is expressed as:

$$psim = \frac{1}{10n} \sum_{i=1}^{n} s_i$$

For query similarity qsim, the form of each query in URL is key=value, assuming the set of key in the query of URL1 and URL2 is expressed as $U^1_{key}$ and $U^2_{key}$, their query similarity qsim is:

$$qsim = \frac{|U^1_{key} \cap U^2_{key}|}{|U^1_{key} \cup U^2_{key}|}$$

(b) Calculating a JSON type similarity sim based on the JSON type expression. Specifically, first calculating the amount of information of the JSON type expression, and the calculation rules are:
1. The amount of information of the empty type is 1, that is, |E|=0.
2. The amount of information of the basic type is 1, the basic type includes String, Boolean, and Number. If T E Primitive, then |T|=1.
3. The amount of information of the object type is equal to the sum of the amount of the type of each key of the object plus 1, whether the key is optional. If TO∈ Object, TO={k1:T1, k2:T2, . . . , km:Tm}, then:

$$|T_O| = \{k_1 : T_1, k_2 : T_2, \ldots, k_m : T_m\} = 1 + \sum_{k=1}^{m} |T_k|$$

4. The amount of information of the streamlined array type is equal to the amount of information of the sub type of the array plus 1, that is:

$$|T_{Element*}| = 1 + |T_{Element}|$$

5. The amount of information of the combination type is equal to the sum of the amount of information of each type. Assuming the combination type contains several basic types of Primitive, as well as array and object types, then:

|(Primitive$_1$+Primitive$_2$+ . . . +Obejct+Array)
 |=|Primitive$_1$|+|Primitive$_2$|+ . . . +|Object|+|Array|

Then, analyzing the upper and lower bounds of the amount of information. When the two types of T1 and T2 are the same, the amount of information after mixing remains unchanged and increases to 0. If T1 and T2 are different, assuming |T1|<=|T2|, then a minimum growth and a maximum growth are divided to discuss. The minimum growth is that the latter's information completely contains the former, so the results after mixing are consistent with the latter, that is, consistent with T2, such as T1=Number, T2=(Number+String), then T1 ⊕T2=(Number+String). The maximum growth is the two types do not overlap at all, the amount of information of the mixed results is equal to the amount of information of the computing object, such as T1=Number, T2=String. T1 ⊕ T2=(Number+String), then |T1 ⊕T2|=|T1|+|T2|. Therefore, after two types are mixed, the upper bound of the information volume is |T1|+|T2|, the lower bound is max (|T1|, |T2|). The maximum growth is the difference between the upper and lower bounds, that is, |T1|+|T2|−max (|T1|, |T2|)=min (|T1|, |T2|). Using a growth rate dist to represent the JSON type distance, and using 1 to reduce the growth rate dist to represent the JSON type similarity sim (T1, T2):

$$dist(T_1, T_2) = \frac{|T_1 \oplus T_2| - \max(|T_1|, |T_2|)}{\min(|T_1|, |T_2|)}$$

$$sim(T_1, T_2) = 1 - \frac{|T_1 \oplus T_2| - \max(|T_1|, |T_2|)}{\min(|T_1|, |T_2|)}$$

(c) The API similarity asim between the two API call traffic is weighted by the JSON type similarity sim and the URL similarity usim, asim=wu×usim+wj×sim, wherein, wu and wj represent weights respectively.

(d) According to the API similarity, the layer cluster algorithm that requires a distance matrix is used to cluster the API similarity. Among them, there are two types of layer cluster algorithm: bottom-up and top-down. The former combines small clusters into large clusters from a single sample point, the latter starts from the whole sample space and gradually splits the samples into small clusters. Among them, the selection of combining and splitting is based on the principle of greedy. Preferably, the bottom-up method can be adopted, and the guidelines for merging clusters include maximum or full connection, average connection, single connection, and so on. The maximum connection or full connection requires minimizing the maximum distance between two points of the clusters. Average connection requires minimizing the average value of all pairwise distances between the clusters. A single connection requires minimizing the distance between the nearest two points of the clusters.

In the embodiment, the API specification generation sub module is used to extract the common attributes of APIs from each API sample cluster, generating an API model, and outputting the API specification in JSON HyperSchema format as the input of the API sharing platform module according to the API model.

In the embodiment, the API model is generated according to the API field and type, and then the API model is converted into JSON Hyperschema format. The API class has four fields, namely request, response, href, method fields. Field request and field response are both object types, including the request header or response header information and the JSON type of the body. Field method is an enumeration type, including the HTTP method GET, POST, PUT, DELETE. The href field represents the address of the API, and the type is URL Template.

Both the Request and Response classes contain header and content fields. The JSON HyperSchema standard suggests that three types of header values should be provided in JSON HyperSchema: allowed methods, method specific request media types, and authentication challenges, while headers with changed values should not appear. Therefore, only headers with consistent values that appear in all API calls of the same class will be recorded in the header field. The field content represents the JSON type of the request body or response body, which is represented by the abstract class Definitions. The abstract class Definitions corresponds to the Type in the JSON type system proposed in this article and is the base class of all JSON types. The only abstract method of the Definitions class is dump( ), and the return value is a string, indicating that the Definitions instance is serialized into JSON Schema. The subclasses of the Definitions class include PrimitiveDef, NullDef, ObjectDef, ArrayDef, UnionDef, which respectively represent the basic type, null type, object type, array type, and union type, they all implement dump( ) method. In the PrimitiveDef class, the type field represents a specific basic type. The NullDef class does not have any fields. The members field of the ObjectDef class is a mapping that stores the key names and types of the members of the object represented by the instance, the optional field is a collection of strings that stores the key names of optional members. The items field of ArrayDef is also of the Definitions type, representing the element type of the array. The only member of UnionDef is defs, which is used to store the basic type, null type, object type or array type in the instance.

Figure 2:
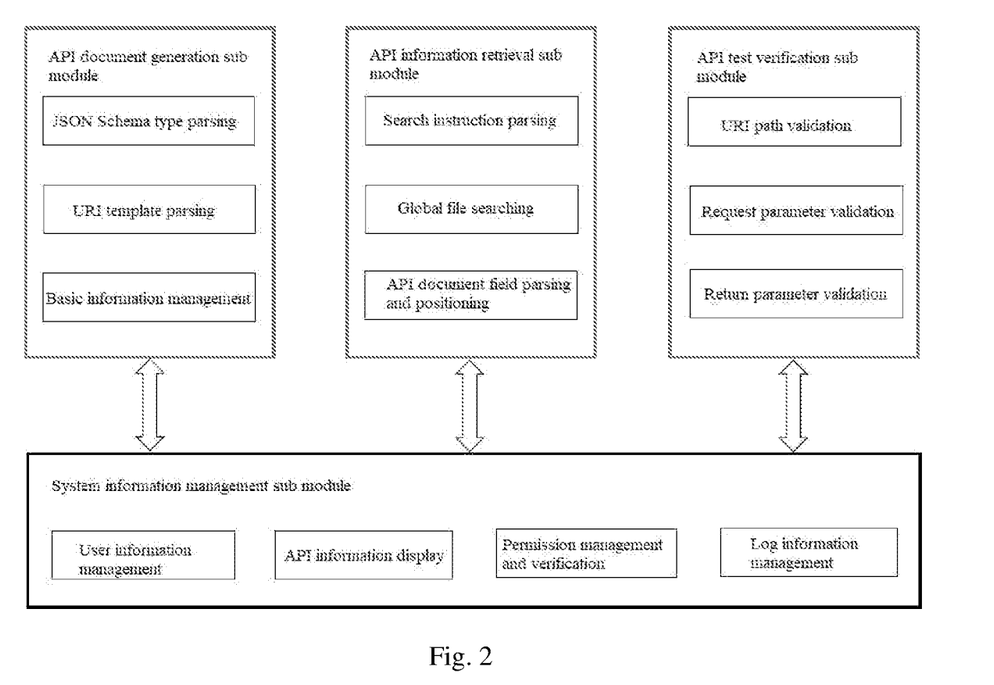
FIG. 2 is a structure diagram of the API sharing platform module provided by an embodiment.

In the embodiment, as shown in FIG. 2, the API sharing platform module includes an API document generation sub module, an API information retrieval sub module, an API test verification sub module and a system information management sub module. After the user grabs the API and generates JSON HyperSchema, it can be uploaded to the API sharing platform for sharing. The API sharing platform will convert JSON HyperSchema into a human readable API document and present it to users. At the same time, users can also retrieve the field information of various APIs in the platform to locate the desired API. Secondly, the API sharing platform provides the function of verifying the API URL and input parameters according to the specification, and verifying the API specification according to the actual API call data. Finally, the API sharing platform provides the system information management function, which can manage and operate the user's account information, permission information, API information and log information in the system.

In the embodiment, the API document generation sub module is used to convert JSON HyperSchema documents into human readable API documents for users to read and use. Based on this, the API document generation module includes JSON Schema parsing operations, URI template parsing operations, and basic information management operations. The execution process of converting JSON HyperSchema documents into API documents is shown in FIG. 3.

Figure 3:
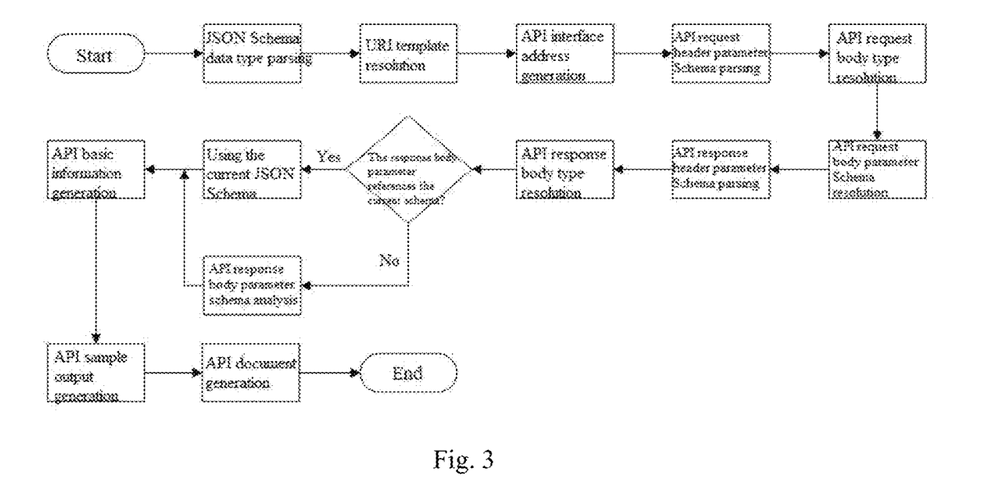
FIG. 3 is the execution process provided by an embodiment that converts the JSON HYPERSCHEMA document to the execution process of API documents.

According to FIG. 3, the API document contains the following fields: API name, API description, API interface address, API sample call address, API request header parameter specification, API request body parameter specification, API response header parameter specification, API response body parameter specification, and API sample output. The API document generation module needs to parse the schema type of each related parameter in the JSON HyperSchema document, and also needs to parse and transform the URI template to generate the API interface address, and finally integrate all information to generate the API document for users. The API document generation module interacts with the system information management module to store the generated API documents in the MongoDB database for persistence.

In the embodiment, the API information retrieval sub module is used to retrieve and filter the API information stored in the API sharing platform, so as to facilitate users to find the API they want, thus saving users' API extraction and conversion time, and improving users' development efficiency. When retrieving APIs, the system will search for items related to user requirements from all APIs with public permissions in the system according to the user's retrieval instructions. At the same time, through the analysis and location of each field in the API document, all APIs that meet the user's requirements are found for users to choose. The operation functions of the API information retrieval module are as follows:

1. Search instruction parsing: the API sharing platform allows users to search APIs in the platform through complex search instructions, such as the and/or operator, or to achieve advanced retrieval of API information through regular expressions.
2. API document field parsing and positioning: after all the API documents containing keywords are found according to the search instructions, the system will parse the fields in the API document to locate the specific location of the keywords in the document, and filter the search results according to the requirements in the search instructions. If the fields specified by the user come from the API output parameters, the API documents whose keywords are not in the output parameter fields will be filtered.

In the embodiment, the API test verification sub module is used to verify whether the API interface address and request information entered by the user conform to the specification and whether the API specification fully conforms to the actual call of the API.

Figure 4:
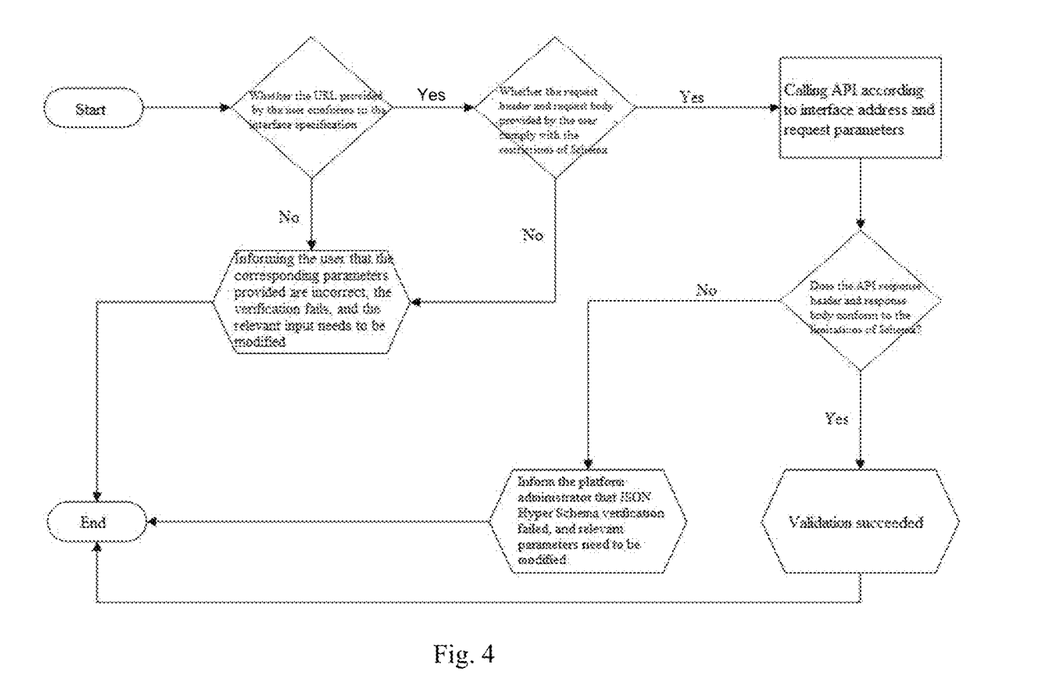
FIG. 4 is the retrieval and screening flowchart performed by the API test verification module provided by an embodiment.

As shown in FIG. 4, the API test verification sub module first checks whether the URL, request header and request body provided by the user conform to the API specification. If not, the system will inform the user that the corresponding parameters provided are incorrect and need to modify the relevant input before re validating, otherwise, the system will call the API in a specified way according to the interface address and request information provided by the user, and get the response result of the API. At this time, the system will reverse verify the API specification according to the corresponding result, so as to verify whether the generated schema really meets the actual call requirements. If yes, the verification is successful, otherwise, the system will notify the platform administrator of the corresponding schema validation failure, and the administrator will coordinate the developers to modify the relevant parameters in JSON HyperSchema, so as to achieve the regular maintenance of each API in the system.

In the embodiment, the system information management sub module is used to manage the user information, permission information, API information and log information in the API sharing platform, and interact with the underlying database to complete the persistent operation. The specific functions of the system information management module are as follows:

1. User information management: responsible for managing the information of various users in the platform, including the registration, login, logout of user accounts and the modification of user basic information. API sharing platform users are divided into two categories: ordinary user and platform administrator. Ordinary user can manage API information under their own accounts, set API permissions, retrieve all public API information in the API sharing platform, and verify and test these APIs. The platform administrator can manage any API information in the platform, and can manage the basic information of ordinary users, as well as API permission operations. At the same time, the platform administrator can combine the log system to process all API information with test errors in the platform, so as to correct the relevant information of JSON HyperSchema of the corresponding API.
2. API information management: managing the API information in the platform, that is, adding, modifing, deleting and viewing API information. The system uses the MongoDB database to store API documents, and displays API information on the front page.
3. Permission management and verification: responsible for managing the operability permissions of APIs in the platform.
4. Log information management: responsible for logging and maintaining all operations in the platform. Logs recorded include: API information generation log, API information management log, user information management log, API test and verification log, system database operation log, etc.

API providers can publish APIs in the API sharing platform module to attract users. The ordinary user can search and call APIs on the platform. The administrator is responsible for managing APIs and users, and viewing and managing logs generated by the system to maintain the operation of the API sharing platform. In addition, any API provider can use the API specification encapsulation system to publish the encapsulation API to its own API sharing platform to achieve the integration and maintenance of customized API information.

The above specific embodiments have described the technical scheme and beneficial effects of the present invention in detail. It should be understood that the above is only the best selected embodiment of the present invention, and is not used to limit the present invention. Any modification, supplement and equivalent replacement made within the principle scope of the present invention should be included in the protection scope of the present invention.

The invention claimed is:

1. A Representational State Transfer (REST) interface specification encapsulation system based on network sniffing, comprising:
   an application interface (API) traffic sniffing module including a mobile terminal and a Man-in-the-Middle Attack server, wherein the API traffic sniffing module intercepts API call traffic in mobile applications based on the principle of a Man-in-the-Middle Attack;
   an API specification extraction module, wherein the API specification extraction module automatically generates an API specification in JSON HyperSchema format, and wherein the API specification extraction module includes:
      a JSON type derivation sub module associated with a JSON type,
      an API clustering sub module associated with a JSON type similarity and a URL similarity, wherein the JSON type similarity and the URL similarity are based on a formal description of JSON types, and wherein the API clustering sub module is associated with multiple API sample clusters; and
      an API specification generation sub module associated with common attributes of APIs from each of the multiple API sample clusters, wherein the API specification generation sub module generates an API model and outputs an API specification in JSON HyperSchema format as an input to an API sharing platform module according to the API model; and
   the API sharing platform module, wherein the API sharing platform module displays the API specification with the JSON HyperSchema format and provides sharing permission control, search, API call test, and API specification error correction functions.

2. The REST interface specification encapsulation system based on network sniffing according to claim 1,
   wherein the mobile terminal is embedded with a self-signed root certificate;
   wherein the Man-in-the-Middle Attack server has a private key of the self-signed root certificate;
   wherein the Man-in-the-Middle Attack server interacts with an API specification encapsulation user;
   wherein the API specification encapsulation user operates a mobile application at the mobile terminal to generate API call traffic;
   wherein the mobile terminal forwards the API call traffic to the Man-in-the-Middle Attack server;
   wherein the Man-in-the-Middle Attack server and the mobile terminal complete a SSL handshake and send the API call traffic to a target application server;
   wherein the Man-in-the-Middle Attack server forwards a response to the mobile terminal from the target application server; and
   wherein the API call traffic intercepted by the API traffic sniffing module is an input to the API specification extraction module.

3. The REST interface specification encapsulation system based on network sniffing according to claim 1,
   wherein, when constructing the API traffic sniffing module, the Man-in-the-Middle Attack server is installed at the same time as performing a Certificate Authority (CA) certificate installation and a network configuration;
   wherein executing the Man-in-the-Middle Attack server implements sniffing of the API call traffic;
   wherein results of the API traffic sniffing module are represented in the form of data columns, specifically including API request time, HTTP method, protocol, IP address, request path, status code, return result type, return result size, and request duration.

4. The REST interface specification encapsulation system based on network sniffing according to claim 1, wherein, the formal description of JSON types is:
   Type::=Primitive|Composite|Union Primitive::=Null|Boolean|Number|String
Composite::=Object|Array
Union::=(Type+Type)
Object::={k1:T1, k2:T2, ... , kn:Tn}
Array::=[T1, T2, ... , Tn]
RArray::=[Type*]
wherein, a root type Type includes basic type Primitive, composite type Composite and combined type Union; the basic type Primitive includes Null, Boolean, Number and String; the composite type Composite includes a universal key value pair-pair type Object and an orderly list type Array; RArray is a streamlined expression of Array; kn is a string type String; and [T1, T2, ... , Tn] indicates a sequence.

5. The REST interface specification encapsulation system based on network sniffing according to claim 1, wherein the API clustering sub module is associated with:
(a) a URL similarity of the API call traffic based on a weighted sum of a URL path similarity and a query similarity;
(b) a JSON type similarity based on a JSON type expression;
(c) an API similarity between two API call traffic, the JSON type similarity, and the URL similarity; and
(d) a layer cluster algorithm that requires a distance matrix based on the API similarity.

6. The REST interface specification encapsulation system based on network sniffing according to claim 5,
wherein, the URL similarity is expressed as usim=wp× psim+wq×qsim, wherein path similarity and query similarity are expressed as psim and qsim respectively, and their weights are wp and wq respectively;
for the path similarity psim, two URLs have a total of N-pair paths, each sub path score of at least one sub path score is scored si, and each pair of sub paths of at least one pair of sub paths has a score based on whether it belongs to different types, and the path similarity is expressed as:

$$psim = \frac{1}{10n}\sum_{i=1}^{n} s_i;$$

and for the query similarity qsim, the form of each query of at least one query in a URL is key=value, wherein a set of keys in the query similarity of URL1 and URL2 of the two URLs is expressed as $U^1_{key}$ and $U^2_{key}$, and wherein the query similarity qsim is expressed as:

$$qsim = \frac{|U^1_{key} \cap U^2_{key}|}{|U^1_{key} \cup U^2_{key}|}.$$

7. The REST interface specification encapsulation system based on network sniffing according to claim 5, wherein, the the REST interface specification encapsulation system based on network sniffing is associated with an amount of information of the JSON type expression, upper and lower bounds of the amount of information, and a growth rate dist to represent a JSON type distance, and wherein the growth rate dist dist ($T_1$, $T_2$) and a JSON type similarity sim sim ($T_1$, $T_2$) are respectively expressed as:

$$dist(T_1, T_2) = \frac{|T_1 \oplus T_2| - \max(|T_1|, |T_2|)}{\min(|T_1|, |T_2|)}$$

$$sim(T_1, T_2) = 1 - \frac{|T_1 \oplus T_2| - \max(|T_1|, |T_2|)}{\min(|T_1|, |T_2|)}.$$

8. The REST interface specification encapsulation system based on network sniffing according to claim 1, wherein the API sharing platform module includes:
an API document generation sub module, wherein the API document generation sub module converts JSON HyperSchema documents into human-readable API documents;
an API information retrieval sub module, wherein the API information retrieval sub module retrieves API information stored in the API sharing platform module;
an API test verification sub module, wherein the API test verification sub module is associated with a verification of whether an API interface address and request information entered by the API specification encapsulation user conform to the API specification and whether the API specification fully conforms to an actual call of the API; and
a system information management sub module, wherein the system information management sub module manages user information, permission information, API information, and log information in the API sharing platform module, and interacts with a database to complete a persistent operation.

\* \* \* \* \*